United States Patent Office
3,037,972
Patented June 5, 1962

3,037,972
PROCESS FOR THE PRODUCTION OF HIGH MOLECULAR WEIGHT POLYETHYLENES WITH METAL ALKYL AND IRON COMPOUND CATALYSTS
Giulio Natta, Piero Pino, and Giorgio Mazzanti, Milan, Italy, assignors to Karl Ziegler, Mulheim (Ruhr), Germany
No Drawing. Filed Nov. 7, 1955, Ser. No. 545,511
Claims priority, application Italy Nov. 15, 1954
14 Claims. (Cl. 260—94.9)

The present invention relates to high molecular weight polyethylenes having molecular weights in excess of 2000 and preferably in excess of 10,000. In general, it is even possible with corresponding catalyst concentrations to obtain polyethylenes with a molecular weight which ranges above that hitherto considered as the upper limit for technically obtainable polyethylenes. This limit is approximately at molecular weights of roughly 50,000 being meant with this figure not more than the statement that solutions of polyethylenes of this kind show a viscosity which, recalculated by means of a certain conventional formula (Journal fuer Praktische Chemie, Series 2, volume 158, page 136 (1941), and Journal of the American Chemical Society, vol. 73, page 1901 (1951)), leads to a molecular weight of 50,000. In the sense of such a definition of the molecular weight, it is possible in accordance with the present application and the previous patent applications mentioned above to obtain polyethylenes having molecular weights of as high as 3,000,000 and more when using suitable catalyst combinations and concentrations.

These high molecular weight polyethylenes, according to the previous known methods, are produced by contacting ethylene with catalysts which consist of mixtures of metal alkyl compounds, especially aluminum alkyl compounds, with compounds of the metals of the side groups of the 4th to 6th group of the periodic system including thorium and uranium.

It has surprisingly been found that high molecular weight polyethylenes usable as plastics materials may also be produced by contacting ethylene with catalysts which consist of mixtures of organic compounds of the metals of the 1st to 3rd group of the periodic system of the general formula $$R_nMeX$$

in which R is a hydrocarbon radical, X is likewise a hydrocarbon radical or halogen, Me is a metal of the the 1st to 3rd group of the periodic system, and $n$ is a number which is by 1 lower than the valence of the metal Me, with iron compounds.

Compounds of lithium, magnesium, zinc or aluminum are preferably used as organic compounds of the metals of the 1st to 3rd group of the periodic system, best results being obtained with aluminum compounds.

Suitable compounds are such in which all metal valences are linked to alkyl groups. Pure metal alkyls of this kind have the highest reactivity. It is also possible, however, to use metal compounds of the formula $$R_nMeX$$

in which X is a halogen such as dialkyl aluminum halides, especially dialkyl aluminum chloride.

The reaction of the iron compounds with the alkyl compounds of the metals of the 1st to 3rd group of the periodic system involves complicated reactions which could not yet be cleared completely. On the one hand, an exchange seems to take place between the anions of the iron compounds and the alkyl groups of the metals of the 1st to 3rd group of the periodic system. It is advantageous, therefore, to use iron compounds which do not contain an anion of oxidizing action which could destroy the metal alkyl compound or enter reactions other than that of the exchange with the alkyl groups. Therefore, iron halides, especially chlorides, will preferably be used.

On the other hand, the iron compounds are reduced in the reaction with the alkyl compounds. However, the reduction must not proceed to the metals which seem to be insignificant for the polymerization of ethylene to high polymers; the reduction of the metal compounds rather stops at compounds of low valence. These are possibly hitherto unknown compounds of monovalent iron. It may be of advantage for this reason to start already with bivalent iron compounds. On the other hand, it is also possible to use trivalent compounds of iron as far as they are converted into such of lower valence during the reaction such as ferric chloride into, for example, ferrous chloride. In this case, solid compounds, especially ferric chloride, may also be used.

The production of the catalysts may be effected by introducing the iron salts into excess metal alkyl compounds as well as conversely by adding to the metal salts a relatively small excess amount of aluminum compound required for proper reduction of the iron salts. The production of the catalysts is preferably effected by reacting the metal alkyl compounds and the iron compound in the presence of a solvent for the metal alkyl. The iron compound need not be soluble in the solvent. When starting in this case with a solid iron salt as, for example, ferric chloride and reacting the same with a compound of a metal alkyl in the presence of a solvent, it is preferable to effect the reaction in a vessel which is provided with a comminution device for the iron chloride. This operation must, of course, be effected in the absence of air and water. A total reaction between the reaction components is not required. It is sufficient that iron compounds which contain metal-alkylic linkages at least at the surface be formed.

Instead of the iron chloride there may also be used other iron halides or other iron compounds, the most electro-negative portion of which can be exchanged against at least 1 alkyl group of the metal alkyl compound.

The production described of catalysts from iron compounds may also be effected with metal alkyl halides such as aluminum alkyl halides rather than with metal alkyls such as aluminum trialkyls.

The polymerization of ethylene may be effected at various temperatures. The process may be operated at subatmospheric, atmospheric or superatmospheric pressures. Pressures in excess of 250 atmospheres need not be used although, of course, the action of the new catalysts on the ethylene remains on principle unchanged if the pressure is increased to any value which is practically still obtainable. However, pressures of 10 to 250 atmospheres will advantageously be used with the catalyst combinations according to the invention.

The new polymerization catalysts are effective at temperatures of as low as room temperature and below. However, at temperatures of below 50° C., the reaction is too slow. It is of advantage, therefore, to operate at temperatures in excess of 50° C. The most convenient reaction temperature depends upon the catalyst on the one hand and upon the degree of polymerization to be obtained on the other hand. When using metal alkyls such as aluminum trialkyls on the one hand and iron compounds on the other hand, it is preferable for obtaining polymers with very high molecular weights of an order of magnitude of 1,000,000 to operate at 50° C. to 80° C. At higher temperatures up to 120° C., polymers with lower molecular weights are obtained.

The polymerization is advantageously effected in the presence of solvents, especially higher paraffin hydrocarbons such as hexane or paraffin, or aromatic hydrocarbons such as benzene. When starting with solid catalysts, then the same are suspended in the inert solvent and the ethylene is gradually introduced into the suspension as the polymerization proceeds while stirring.

Instead of pure ethylene, ethylene-containing gas mixtures may also be processed in accordance with the invention.

The products in accordance with the invention exhibit a substantially linear structure and possess practically no branchings. The products according to the invention contain at most 3 methyl groups per 100 methylene groups. In general, the percentage of methyl groups is still substantially lower and amounts at most to 0.03%, in many cases even less than 0.01%. Ultraspectrographs of the products according to the invention, in contrast to those of the hitherto known polyethylenes, do not show characteristic methyl bands.

The polyethylenes in accordance with the invention show a high crystallinity which remains unchanged up to temperatures above 100° C. and disappears only in the vicinity of the softening point. As indicated by X-ray graphs, the degree of crystallinity is generally about 80% and in many cases even more.

The raw polymerization product may be coloured due to the presence of iron compounds. However, it can easily be freed from the catalyst and thereby discolourized by treating the polymerization product with an acid, preferably in the presence of a solvent for the catalyst compounds contained in the polymer. It is preferable for this operation to add a wetting agent which favours the dissolution of the catalyst compounds.

The polyethylenes in accordance with the invention have a softening or melting point in excess of 130° C. The heat resistance of the new products is higher than that of the known polyethylenes. When heating the new products to temperatures above 250° C., they retain their white colour while the colour of the known products changes into gray between 200 and 250° C. The stability of the new products to oxidation by atmospheric oxygen is also higher.

At room temperature, the products of the invention are completely insoluble in all solvents. The lower molecular weight ones (up to a molecular weight of about 100,000) dissolve partially only above 70° C., the higher molecular weight ones (having a molecular weight in excess of 100,000) partially only above 100° C.

The products may readily be processed to form clear, transparent, elastic and flexible sheets or films as, for example, bewteen heated plates. They are also suitable for processing in extruding presses or by the injection moulding process. They can be elongated cold and extended in this manner to form strips, wires or threads of high elasticity and strength which could never be obtained with polyethylenes produced by other methods.

The tear resistance is at least 100 kilograms per square centimeter and in many cases more than 200 kilograms per square centimeter. The tensile strength is more than 200 kilograms per square centimeter in the unextended state and as high as 3000 kilograms per square centimeter in cases of excellent orientation after extension.

As early as during the processing, the products show a marked tendency to fiber formation. In the molten state, they can be spun to threads by the methods usual for spinning super-polyamide fibers such as nylon fibers. The threads produced from the new polyethylenes may be used as fibers for industrial purposes.

*Example 1*

Two steel balls and a glass ampulla containing 5 grams of anhydrous iron chloride were placed in an autoclave of 435 cc. contents. A solution of 11 grams of amyl lithium in 130 cc. of n-heptane is allowed to flow into the autoclave from which the air has first been removed. The temperature is increased to 80° C. and ethylene is introduced to a pressure of 60 atmospheres. While stirring, the temperature is maintained between 80 and 90° C. and the pressure between 40 and 50 atmospheres. If a pressure drop does no longer occur, the unreacted ethylene is discharged and methanol is introduced in order to decompose the catalyst. The reaction product is treated with hydrochloric acid to remove the inorganic compounds present.

The reaction product consists in part of a solid polymer the crystalline structure of which as determined by X-ray analysis appears to be identical with that of the polyethylene obtained according to the following examples.

*Example 2*

Several stainless steel balls of 1 inch in diameter and a glass ampulla containing 10 grams of anhydrous sublimated ferric chloride were placed in a stainless steel autoclave having a capacity of 2140 cc.

Then a solution of 11.4 grams of triethyl aluminum in 500 cc. of anhydrous benzene is introduced under nitrogen into the sealed autoclave from which the air has first been removed. The temperature is increased to 40° C., ethylene is introduced until a pressure of 50 atmospheres is reached, and the autoclave is imparted a swinging motion to break the glass ampulla. The temperature is then allowed to increase to 70° C. while a substantial pressure drop is noticed. As soon as the pressure has decreased to 30 atmospheres, ethylene is again introduced until the pressure has increased to 50 atmospheres. The autoclave is maintained at a temperature between 60 and 70° C. while stirring and new ethylene is added as often as the pressure decreases to 30 atmospheres. After seven hours, calculated from the beginning of the polymerization, the unreacted ethylene is discharged and 100 cc. methanol is introduced into the autoclave to decompose the metal alkyl present.

There is withdrawn from the autoclave a solid polymer mass which is treated in the heat with acids to remove the inorganic products present and is dried in the heat in vacuo.

In this manner, 250 grams of solid, pulverulent product is isolated, which, by heating under nitrogen, begins to sinter at 123° C., becomes plastic at higher temperatures, and does not melt even at a temperature of 200° C.

The polymer obtained appears crystalline in X-ray analysis. In tetraline solution at 135° C., it shows an intrinsic viscosity which corresponds to that of an unbranched polyethylene having a molecular weight of above 1,500,000.

*Example 3*

Several steel balls and a glass ampulla containing 10 grams of anhydrous ferric chloride are placed in a steel autoclave of 2150 cc. contents. A solution of 11.4 grams of triethyl aluminum in 500 cc. of anhydrous n-heptane is then introduced under nitrogen into the sealed autoclave from which the air has first been removed. The autoclave is heated to 70° C. At this temperature, ethylene is introduced while stirring until a pressure of 50 atmospheres is reached. The autoclave is agitated for 3 hours at a temperature between 70 and 89° C. and a pressure which varies between 40 and 52 atmospheres while new ethylene is introduced as soon as the pressure has decreased below 40 atmospheres. Then the unreacted ethylene is removed and 100 cc. of methanol is introduced to decompose the catalyst.

A pulverulent light yellow mass is discharged from the autoclave and is repeatedly washed with hydrochloric acid and methanol. The polymer treated hot with tetraline and hydrochloric acid is then coagulated with acetone, filtered and repeatedly washed with acetone.

The product dried hot in vacuo consists of a white pulverulent product having a weight of 145 grams and showing the same behavior as the product described in Example 2 when heated under nitrogen. In a tetraline solution at 135° C., it shows an intrinsic viscosity which corresponds to a molecular weight of more than 1,000,000.

Example 4

Two steel balls and a glass ampulla containing 5.3 grams of ferric ferrous cyanide are placed in a stainless steel autoclave of 435 cc. contents. A solution of 8.2 grams of triethyl aluminum in 100 cc. of heptane is introduced under nitrogen into the autoclave from which the air has first been removed. The temperature is then increased to 80° C. and ethylene is introduced to a pressure of 52 atmospheres and the stirring is started. After heating for 3 hours at temperatures of below 100° C., the pressure has decreased to 30 atmospheres. Additional ethylene is then introduced until the pressure has been brought to the initial value. As soon as the pressure has decreased to 10 atmospheres, the unreacted ethylene is discharged and the catalyst decomposed with methanol. It is possible to isolate from the mass of reaction products a solid polymer having a softening point of about 110° C. Only 10% of this polymer is extractable with ether. The extraction residue has a molecular weight of above 100,000.

Example 5

10 cc. of dimethyl aluminum monobromide +1.1 grams of anhydrous iron (III) chloride were first mixed in the cold with no action being noticed during this mixing, and then heated for 5 hours at 160° C. The polymerization catalyst thus prepared, together with 200 cc. of hexane, was filled under exclusion of air into an autoclave of 500 cc. contents and then 98 grams of ethylene were pressed in. When heating the autoclave to 100–110° C. while shaking, the pressure increases at first to 230 atmospheres decreasing thereafter during about 70 hours to 32 atmospheres. After cooling, the remaining residual pressure was released whereby 9 grams of ethylene escaped in gas form. Thereafter, the contents of the autoclave consisted of a slurry-like suspension of a solid polyethylene in hexane, which was at first of somewhat dark colour due to residues of the iron-containing catalyst, but which became pure while after sucking-off and treatment with methanolic hydrochloric acid. There was finally obtained 84 grams of a high melting snow-white polyethylene which could be pressed at 150 to 170° C. to form excellent films.

Example 6

10 cc. of diethyl aluminum monochloride+1.3 grams of anhydrous iron (II) chloride+70 cc. of hexane were mixed under nitrogen in the cold and then thoroughly ground for two hours in a ball mill. Thereafter, a light brown suspension of a solid material had formed in the hexane, which was filled under nitrogen into a 200 cc. autoclave. Then 39 grams of ethylene were pressed in and the autoclave was heated to 110° C. while shaking. At the beginning of the experiment, the pressure in the autoclave was 50 atmospheres at room temperature. While heating, the pressure increased to about 80 to 90 atmospheres only and after as little as 4 hours it was only 30 atmospheres at 100° C. After further 21 hours, the pressure was only 20 atmospheres at 110° C. The product was processed in the same manner as described in Example 5. There was obtained 13 grams of solid polyethylene in addition to 17 grams of recovered ethylene. In this Example 6, the iron (II) chloride may be replaced by the equivalent amount of iron (III) chloride. The course of the experiment is similar to that described in Example 5.

We claim:
1. Process for the production of high molecular weight polyethylenes usable as plastic materials by polymerization of ethylene in the presence of catalysts which comprises contacting ethylene with a catalyst essentially consisting of a mixture of an organic compound of a metal Me selected from the group consisting of lithium, magnesium, zinc and aluminum, said organic compound being of the general formula

$$R_nMeX_y$$

in which R is a hydrocarbon radical, X is a member selected from the group consisting of hydrocarbon radicals and hydrogen, $n$ and $y$ are whole integer numbers the sum of which is equal to the valence of the metal Me, with a compound of iron selected from the group consisting of ferrous and ferric halides and iron cyanide, said contacting being effected in a reaction media in which said compound of iron will remain non-ionized.

2. Process according to claim 1, in which said organic metal compound is a metal alkyl.

3. Process according to claim 1, in which said organic metal compound is an alkyl metal monohalide.

4. Process according to claim 1, in which said iron compound is one substantially free from oxidizing anion.

5. Process according to claim 1, in which said halide is an iron chloride.

6. Process according to claim 5, in which said chloride is a ferric chloride.

7. Process according to claim 1, in which said catalyst is constituted of a substantially solid iron compound containing iron alkyl on at least the surface thereof.

8. Process according to claim 1, in which said organic metal compound is a metal alkyl and in which said iron compound is one having anions exchangeable against the alkyl group of said metal alkyl.

9. Process according to claim 8, in which said iron compound is used in the presence of an inert solvent for said metal alkyl.

10. Process according to claim 1, in which said contacting is effected at pressures of 10 to 25 atmospheres.

11. Process according to claim 1, in which said contacting is effected at temperatures between 50° and 120° C.

12. Process according to claim 11, in which said organic metal compound is a metal alkyl and in which said contacting is effected at a temperature of substantially 50–80° C.

13. Process according to claim 1, in which said contacting is effected in the presence of solvents selected from the group consisting of higher paraffinic and aromatic hydrocarbons.

14. Process according to claim 1 in which said ethylene is gaseous ethylene.

References Cited in the file of this patent

UNITED STATES PATENTS

| | | |
|---|---|---|
| 2,721,189 | Anderson et al. | Oct. 18, 1955 |
| 2,882,263 | Natta et al. | Apr. 14, 1959 |

FOREIGN PATENTS

| | | |
|---|---|---|
| 682,420 | Great Britain | Nov. 12, 1952 |
| 533,362 | Belgium | Nov. 16, 1954 |

OTHER REFERENCES

Calloway: "Chemical Reviews," vol. 17, pages 327 and 374–377 (1935).

Gillman: "Organic Chemistry," published by Wiley and Sons, Inc., New York, 1938, page 477.

UNITED STATES PATENT OFFICE
CERTIFICATE OF CORRECTION

Patent No. 3,037,972                                June 5, 1962

Giulio Natta et al.

It is hereby certified that error appears in the above numbered patent requiring correction and that the said Letters Patent should read as corrected below.

Column 3, line 19, for "temperatures" read -- temperature --; column 6, line 11, for "hydrogen" read -- halogen --.

Signed and sealed this 11th day of September 1962.

(SEAL)
Attest:

ERNEST W. SWIDER
Attesting Officer

DAVID L. LADD
Commissioner of Patents